United States Patent
Kuo et al.

(10) Patent No.: US 9,411,184 B2
(45) Date of Patent: Aug. 9, 2016

(54) BACK PLATE SPLICING STRUCTURE FOR LARGE-SIZE BACKLIGHT MODULES AND LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventors: Yi-cheng Kuo, Guangdong (CN); Yuchun Hsiao, Guangdong (CN); Yanxue Zhang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 262 days.

(21) Appl. No.: 13/981,908

(22) PCT Filed: Jun. 27, 2013

(86) PCT No.: PCT/CN2013/078207
§ 371 (c)(1),
(2) Date: Jul. 25, 2013

(87) PCT Pub. No.: WO2014/173001
PCT Pub. Date: Oct. 30, 2014

(65) Prior Publication Data
US 2014/0321094 A1    Oct. 30, 2014

(30) Foreign Application Priority Data

Apr. 25, 2013   (CN) .......................... 2013 1 0148493

(51) Int. Cl.
*G02F 1/1333*   (2006.01)
*F16B 5/06*   (2006.01)

(52) U.S. Cl.
CPC ........ *G02F 1/1333* (2013.01); *G02F 1/133308* (2013.01); *F16B 5/0635* (2013.01); *G02F 2001/133314* (2013.01); *G02F 2001/133317* (2013.01); *Y10T 403/7016* (2015.01)

(58) Field of Classification Search
CPC .................... G02F 1/133308; G02F 1/133608; G02F 2001/133322; G02F 2201/465; G02F 2201/46; G02F 2001/133314; G02F 2001/13317; G02B 6/241; G02B 6/36; G02B 6/4256; G02B 6/426; G02B 6/4219; G02B 6/4228; Y10T 403/7016; Y10S 345/905; F16B 5/0635; F16B 5/0685
USPC .................. 349/58, 60, 62; 385/50, 136, 147; 362/217.1–217.17, 249.01, 362, 367, 362/616, 97.1–97.3, 632–634; 348/787, 348/789, 794, 836, 840, 843; 345/905
See application file for complete search history.

(56) References Cited

U.S. PATENT DOCUMENTS

| | | | |
|---|---|---|---|
| 8,042,986 B2 * | 10/2011 | Qian ................... | G02B 6/0068 349/150 |
| 2013/0027628 A1 * | 1/2013 | Zhou ................... | H05K 7/2099 349/58 |

FOREIGN PATENT DOCUMENTS

| CN | 101206334 A | 6/2008 |
|---|---|---|
| CN | 202660487 U | 1/2013 |

OTHER PUBLICATIONS

International Search Report of PCT Patent Application No. PCT/CN2013/078207 issued on Jan. 30, 2014.
1st Office Action of counterpart Chinese Patent Application No. 201310148493.9 issued on Jul. 28, 2014.

* cited by examiner

*Primary Examiner* — Paisley L Arendt
*Assistant Examiner* — Angela Davison

(57) ABSTRACT

The present disclosure provides a back plate splicing structure for large-size backlight modules. The back plate includes a bottom flat plate and a splicing member joined to an end of the bottom flat plate, wherein the splicing member includes a side plate, and an upper supporting plate and a lower supporting plate configured on a same side of the side plate; the upper supporting plate, the lower supporting plate, and the side plate cooperatively define a clamping opening clamping the bottom flat plate therein; the upper supporting plate fixes the bottom flat plate in the clamping opening, and at least one fixing screw is configured between the bottom flat plate and the splicing member.

16 Claims, 2 Drawing Sheets

BACK PLATE SPLICING STRUCTURE FOR LARGE-SIZE BACKLIGHT MODULES AND LIQUID CRYSTAL DISPLAY

BACKGROUND

1. Technical Field

The present disclosure relates to liquid crystal displaying technologies, and particularly, to a back plate splicing structure for large-size backlight modules and a liquid crystal display with the same.

2. Description of Related Art

With the innovation of LCD technologies, large-size liquid crystal televisions become more and more mature and simultaneously become cheaper and cheaper. The innovation of the technology of large-size backlight source has become a trend. At present, back plates of most of large-size backlight modules are formed by splicing a number of flat plates.

However, existing methods for producing the back plate by splicing a number of flat plates via screws has the following disadvantages: 1. with much locking and attachment of screws, it requires much labor to assemble the back plate by hand in the production and assembly process, which results in poor mass production performance and low production capacity; 2, with large number of screw holes, missing locking of some screw holes may happen frequently, resulting in the looseness of the back plate; 3, with the large number of screw holes defined in the back plate, the tolerance of the back plate as a whole such as the pressure resistance of the back plate has been reduced greatly, which affects the quality and the lifetime of the back plate.

SUMMARY

The main object of the present disclosure is to provide a back plate splicing structure for large-size backlight modules, which is simply structured, easy to be assembled, and requires less screw consumption to overcome the shortcomings of the conventional back plate splicing structure.

For achieving the above object, the back plate splicing structure for large-size backlight modules includes a bottom flat plate and a splicing member joined to an end of the bottom flat plate, wherein the splicing member includes a side plate, and an upper supporting plate and a lower supporting plate configured on a same side of the side plate; the upper supporting plate, the lower supporting plate, and the side plate cooperatively define a clamping opening clamping the bottom flat plate therein; the upper supporting plate fixes the bottom flat plate in the clamping opening, and at least one fixing screw is configured between the bottom flat plate and the splicing member.

Preferably, the upper supporting plate and the lower supporting plate are perpendicular to the side plate, a bottom surface of the upper supporting plate, a top surface of the lower supporting plate, and the side plate cooperatively define the clamping opening clamping the bottom flat plate; and a post-groove assembly structure is configured on the bottom surface of the upper supporting plate and the bottom flat plate.

Preferably, a protruding post is configured on the bottom surface of the upper supporting plate, and a groove engageable with the protruding post is defined in the bottom flat plate.

Preferably, a protruding post is configured on the bottom flat plate, and a groove engageable with the protruding post is defined in the bottom surface of the upper supporting plate.

Preferably, the upper supporting plate includes a connecting portion perpendicularly connected to the side plate, a clamping surface portion contacting the bottom flat plate, and an inclined surface portion connecting the connecting portion and the inclined surface portion; the connecting portion, the inclined surface portion, the lower supporting plate, and the side plate cooperatively define the clamping opening clamping the bottom flat plate; and a body of the bottom flat plate is curved towards the clamping opening to form a protruding arc column structure.

Preferably, the fixing screw is configured between the clamping surface portion and the bottom flat plate.

Preferably, a bottom surface of the upper supporting plate, a top surface of the lower supporting plate, and the side plate cooperatively define a clamping opening clamping the bottom flat plate therein; a protrusion is configured on the bottom surface of the upper supporting plate, and a curved clamp clamping the protrusion therein is configured on an end of the bottom flat plate.

Preferably, the curved clamp includes a horizontal curved portion and a vertical clamping portion, and a slot receiving the vertical clamping portion therein is defined in a clamping surface of the upper supporting plate.

Preferably, the upper supporting plate includes a connecting portion perpendicularly configured on the side plate, a clamping surface portion contacting the bottom flat plate, and an inclined surface portion connecting the connecting portion and the clamping surface portion; the connecting portion, the inclined surface portion, the lower supporting plate, and the side plate cooperatively define a clamping opening clamping the bottom flat plate therein; and a body of the bottom flat plate is curved towards the clamping opening to form a protruding arc column structure.

The present disclosure further provides another back plate splicing structure for large-size backlight modules. The back plate includes a bottom flat plate and a splicing member joined to an end of the bottom flat plate, wherein the splicing member includes a side plate, and an upper supporting plate and a lower supporting plate configured on a same side of the side plate; the upper supporting plate includes a connecting portion perpendicularly configured on the side plate, a clamping surface portion contacting the bottom flat plate, and an inclined surface portion connecting the connecting portion and the clamping surface portion; the connecting portion, the inclined surface portion, the lower supporting plate, and the side plate cooperatively define a clamping opening clamping the bottom flat plate therein; a protrusion is configured on a bottom surface of the upper supporting plate, and a curved clamp clamping the protrusion therein is configured on an end of the bottom flat plate; the curved clamp includes a horizontal curved portion and a vertical clamping portion, and a slot receiving the vertical clamping portion therein is configured on a clamping surface of the upper supporting plate; a body of the bottom flat plate is curved towards the clamping opening to form a protruding arc column structure; and at least one fixing screw is configured between the bottom flat plate and the splicing member.

The present disclosure yet further provides a liquid crystal display, including a back plate splicing structure for large-size backlight modules, wherein the back plate includes a bottom flat plate and a splicing member joined to an end of the bottom flat plate, the splicing member includes a side plate, and an upper supporting plate and a lower supporting plate configured on a same side of the side plate; the upper supporting plate, the lower supporting plate, and the side plate cooperatively define a clamping opening clamping the bottom flat plate therein; the upper supporting plate fixes the bottom flat plate in the clamping opening, and at least one fixing screw is configured between the bottom flat plate and the splicing member.

Preferably, the upper supporting plate and the lower supporting plate are perpendicular to the side plate, a bottom surface of the upper supporting plate, a top surface of the lower supporting plate, and the side plate cooperatively define the clamping opening clamping the bottom flat plate therein; and a post-groove assembly structure is configured on the bottom surface of the upper supporting plate and the bottom flat plate.

Preferably, a protruding post is configured on the bottom surface of the upper supporting plate, and a groove engageable with the protruding post is configured on the bottom flat plate.

Preferably, a protruding post is configured on the bottom flat plate, and a groove engageable with the protruding post is configured in the bottom surface of the upper supporting plate.

Preferably, the upper supporting plate includes a connecting portion perpendicularly configured on the side plate, a clamping surface portion contacting the bottom flat plate, and an inclined surface portion connecting the connecting portion and the clamping surface portion; the connecting portion, the inclined surface portion, the lower supporting plate, and the side plate cooperatively define the clamping opening clamping the bottom flat plate therein; and a body of the bottom flat plate is curved towards the clamping opening to form a protruding arc column structure.

Preferably, the at least one fixing screw is configured between the clamping surface portion and the bottom flat plate.

Preferably, a bottom surface of the upper supporting plate, a top surface of the lower supporting plate, and the side plate cooperatively define the clamping opening clamping the bottom flat plate therein; a protrusion is configured on the bottom surface of the upper supporting plate, and a curved clamp clamping the protrusion therein is configured on an end of the bottom flat plate.

Preferably, the curved clamp includes a horizontal curved portion and a vertical clamping portion, and a clamping surface of the upper supporting plat defines a slot receiving the vertical clamping portion therein.

Preferably, the upper supporting plate includes a connecting portion perpendicularly configured on the side plate, a clamping surface portion contacting the bottom flat plate, and an inclined surface portion connecting the connecting portion and the clamping surface portion; the connecting portion, the inclined surface portion, the lower supporting plate, and the side plate cooperatively define the clamping opening clamping the bottom flat plate therein; a body of the bottom flat plate is curved towards the clamping opening to form a protruding arc column structure.

Compared with the conventional assembly method, the back plate splicing structure for large-size backlight modules of the present disclosure can realize the fixing of the back plate in two dimensions out of three dimensions. After that, the back plate can be fixed in the third dimension by using a few screws, which not only achieves the tight assembly of the back plate, but also greatly reduces required processes, reduces the consuming amount of the screws, reduces the assembly time, and greatly improves the labor efficiency.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

The present disclosure provides a back plate splicing structure for large-size backlight modules.

Figure 1:
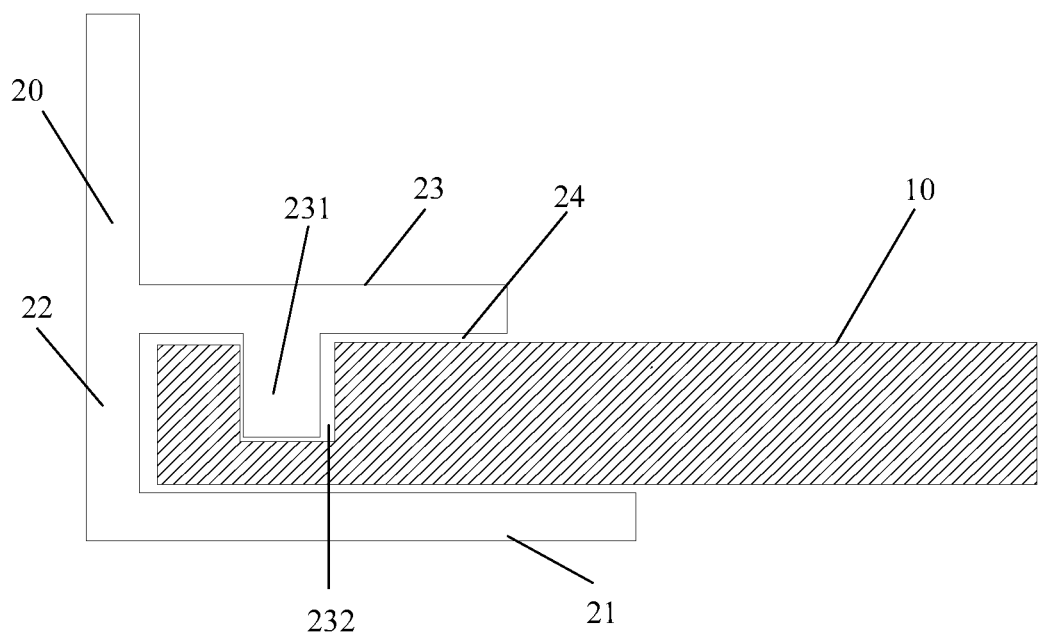
FIG. 1 is a schematic view of a back plate splicing structure for large-size backlight modules in accordance with a first embodiment of the present disclosure.

Referring to FIG. 1, which is schematic view of the back plate splicing structure for large-size backlight modules in accordance with a first embodiment of the present disclosure.

In the back plate splicing structure for large-size backlight modules of the first embodiment, the back plate includes a bottom flat plate 10 and a splicing member 20 joined to an end side of the bottom flat plate 10. The splicing member 20 includes a side plate 22, and an upper supporting plate 23 and a lower supporting plate 21 configured on a same side of the side plate 22 and being perpendicular to the side plate 22. A top surface of the lower supporting plate 21, the side plate 22, and a bottom surface of the upper supporting plate 23 cooperatively define a clamping opening which clamps the bottom flat plate 10 therein. A protruding post 231 is configured on the bottom surface of the upper supporting plate 23, and a groove 232 engageable with the protruding post 231 is defined in the bottom flat plate 10. Additionally, at least one fixing screw (not shown in the drawings) is configured between the bottom flat plate 10 and the splicing member 20.

With the back plate splicing structure for large-size backlight modules, in the assembly process, the bottom flat plate 10 is aligned with the clamping opening 24, which allows the groove 232 to be aligned with the protruding post 231. After that, the back plate can be assembled by pushing the bottom flat plate 10 into the splicing member 20. The assembly of the back plate can be finished thereafter by locking a few fixing screws.

Compared with the conventional assembly method, the back plate splicing structure for large-size backlight modules of the present disclosure can realize the fixing of the back plate in two dimensions out of three dimensions. After that, the back plate can be fixed in the third dimension by using a few screws, which not only achieves the tight assembly of the back plate, but also greatly reduces required processes, reduces the consuming amount of the screws, reduces the assembly time, and greatly improves the labor efficiency.

The protruding post 231 is not limited to be configured on the bottom surface of the upper supporting plate 23 shown in the above embodiment, but also can be configured on the bottom flat plate 10 in flexible applications. Correspondingly, the same effect can be achieved by configuring the groove 232 on the bottom surface of the upper supporting plate 23.

In order to further facilitate the assembly of the fixing screws, in the above embodiment, the fixing screws can be configured between the lower supporting plate 23 and the bottom flat plate 10.

Figure 2:
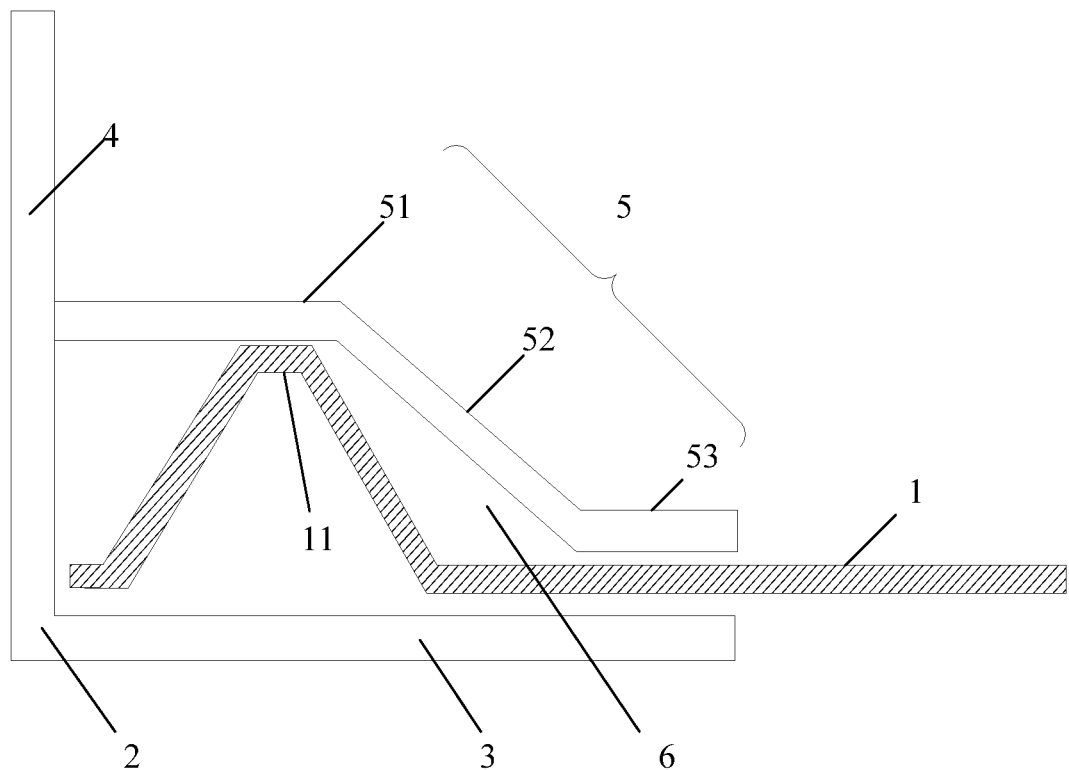
FIG. 2 is a schematic view of a back plate splicing structure for large-size backlight modules in accordance with a second embodiment of the present disclosure.

Referring further to FIG. 2, which is a schematic view of a back plate splicing structure for large-size backlight modules in accordance with a second embodiment of the present disclosure.

In the back plate splicing structure for large-size backlight modules of the second embodiment of the present disclosure, the back plate includes a bottom flat plate 1 and a splicing member 2 joined to an end of the bottom flat plate 1. The splicing member 2 includes a side plate 4, and an upper supporting plate 5 and a lower supporting plate 3 configured on the same side of the side plate 4. The upper supporting plate 5 includes a connecting portion 51 perpendicularly configured on the side plate 4, a clamping surface portion 53 contacting the bottom flat plate, and an inclined surface portion 52 which connects the connecting portion 51 and the clamping surface portion 53. The connecting portion 51, the inclined surface portion 52, the lower supporting plate 1, and the side plate 1 cooperatively define a clamping opening 6 which clamps the bottom flat plate 1 therein. A body of the bottom flat plate 1 is curved towards the clamping opening 6 to form a protruding arc column structure 11. At least one fixing screw (not shown in the drawings) is configured between the bottom flat plate 1 and the splicing member 2.

With the back plate splicing structure for large-size backlight modules of the second embodiment, similar to the first embodiment, in the assembly process, the bottom flat plate 1 is aligned with the clamping opening 6 laterally and the assembly of the back plate is finished by pushing the bottom flat plate 1 into the clamping opening 6. Furthermore, since the body of the bottom flat plate 1 is curved to form the protruding arc column structure 11, the bottom flat plate 1 is clamped in the clamping opening 6 after being assembled into the splicing member 2, which fixes the splicing member 2 in two dimensions out of three dimensions. After that, secure assembly of the back plate can be achieved by using a few screws to realize the fixing in the third dimension.

In order to facilitate the assembly of the screws, in the above embodiment, the screws can be configured between the clamping surface portion 53 and the bottom flat plate 1.

Figure 3:
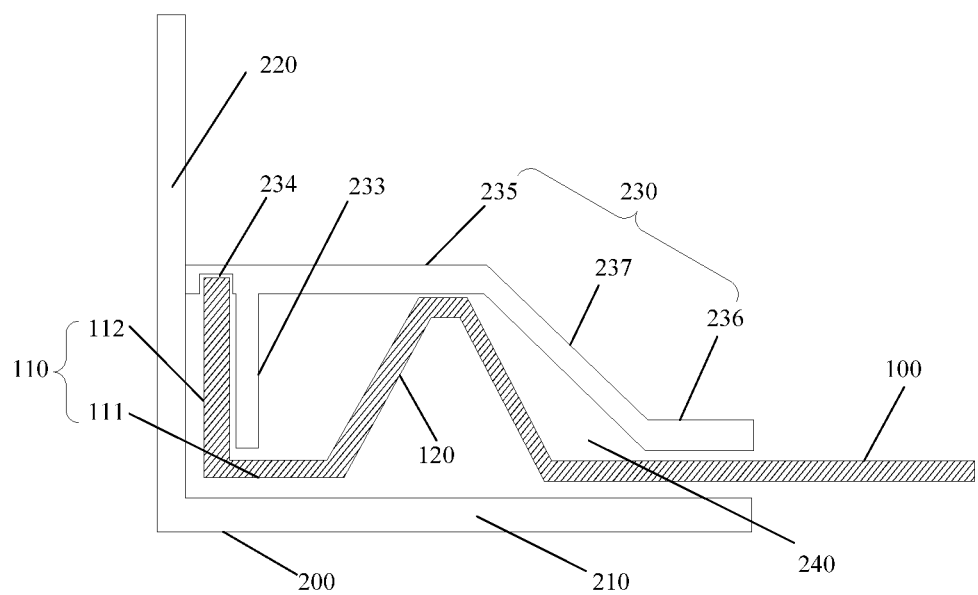
FIG. 3 is a schematic view of a back plate splicing structure for large-size backlight modules in accordance with a third embodiment of the present disclosure.

Referring further to the FIG. 3, which is a schematic view of a back plate splicing structure for large-size backlight modules in accordance with a third embodiment of the present disclosure.

In the third embodiment, the back plate includes a bottom flat plate 100 and a splicing member 200 joined to an end of the bottom flat plate 100. The splicing member 200 includes a side plate 220, and an upper supporting plate 230 and a lower supporting plate 210 configured on a same side of the side plate 220. The upper supporting plate 230, the lower supporting plate 210, and the side plate 220 cooperatively define a clamping opening 240 clamping the bottom flat plate 100 therein. A protrusion 233 is configured on a clamping surface of the upper supporting plate 230, and a curved clamp 110 clamping the protrusion 233 therein is configured on one end of the bottom flat plate 100. At least one fixing screw (not shown in the drawings) is configured between the bottom flat plate 100 and the splicing member 200.

With the splicing structure for large-size backlight modules of the third embodiment, similar to the first and second embodiments, in assembly the bottom flat plate 100 is aligned with the clamping opening 240 laterally, which allows the curved clamp 110 to clamp the protrusion 233 therein. The assembly can be finished by pushing the bottom flat plate 100 into the clamping opening 240. The back plate is fixed in two dimensions out of three dimensions via the clamping structure and thereafter is fixed in the third dimension via a few screws, which realizes the secure assembly.

In the above embodiment, in order to strengthen the stability of the splicing of the back plate, the curved clamp 110 includes a horizontal curved portion 111 and a vertical clamping portion 112. A slot 234 receiving the vertical clamping portion 112 therein is defined in the clamping surface of the upper supporting plate 230.

In the above embodiment, specifically, the upper supporting plate 230 includes a connecting portion 235 perpendicularly connected to the side plate, a clamping surface portion 236 contacting the bottom flat plate 100, and an inclined surface portion 237 connecting the connecting portion 235 and the clamping surface portion 236. The connecting portion 235, the inclined surface portion 237, the lower supporting plate 210, and the side plate 220 cooperatively define the clamping opening 240. The body of the bottom flat plate 100 is curved towards the clamping opening 240 to form a protruding arc column structure 120 which further strengths the splicing of the back plate. Furthermore, in the above embodiment, the fixing screw can be configured on the clamping surface portion 236 for fixing the bottom flat plate 100 to the splicing member 200.

The present disclosure further provides a liquid crystal display includes the above back plate splicing structure for large-size backlight modules wherein the back plate splicing structure can be referred to that of the first, second, and third embodiment.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A back plate splicing structure for large-size backlight modules, the back plate comprising a bottom flat plate and a splicing member joined to an end of the bottom flat plate, wherein the splicing member comprises a side plate, and an upper supporting plate and a lower supporting plate configured on a same side of the side plate; the upper supporting plate, the lower supporting plate, and the side plate cooperatively define a clamping opening clamping the bottom flat plate therein; the upper supporting plate fixes the bottom flat plate in the clamping opening, and at least one fixing screw is configured between the bottom flat plate and the splicing member;

wherein the upper supporting plate comprises a connecting portion perpendicularly connected to the side plate, a clamping surface portion contacting the bottom flat plate, and an inclined surface portion connecting the connecting portion and the clamping surface portion, the inclined surface portion and the side plate face each other and are positioned at two opposite ends of the connecting portion respectively; the connecting portion, the inclined surface portion, the lower supporting plate, and the side plate cooperatively define the clamping opening clamping the bottom flat plate therein; and a body of the bottom flat plate is curved towards the clamping opening to form a protruding arc column structure and the inclined surface portion and the clamping opening are on the same side of the protruding arc column structure.

2. The back plate splicing structure for large-size backlight modules as claimed in claim 1, wherein the upper supporting plate and the lower supporting plate are perpendicular to the side plate, a bottom surface of the upper supporting plate, a top surface of the lower supporting plate, and the side plate cooperatively define the clamping opening clamping the bottom flat plate therein; and a post-groove assembly structure is configured on the bottom surface of the upper supporting plate and the bottom flat plate.

3. The back plate splicing structure for large-size backlight modules as claimed in claim 2, wherein a protruding post is configured on the bottom surface of the upper supporting plate, and a groove engageable with the protruding post is defined in the bottom flat plate.

4. The back plate splicing structure for large-size backlight modules as claimed in claim 2, wherein a protruding post is configured on the bottom flat plate, and a groove engageable with the protruding post is defined in the bottom surface of the upper supporting plate.

5. The back plate splicing structure for large-size backlight modules as claimed in claim 1, wherein the fixing screw is configured between the clamping surface portion and the bottom flat plate.

6. The back plate splicing structure for large-size backlight modules as claimed in claim 1, wherein a bottom surface of the upper supporting plate, a top surface of the lower supporting plate, and the side plate cooperatively define a clamping opening clamping the bottom flat plate therein; a protrusion is configured on the bottom surface of the upper supporting plate, and a curved clamp clamping the protrusion therein is configured on an end of the bottom flat plate.

7. The back plate splicing structure for large-size backlight modules as claimed in claim 6, wherein the curved clamp comprises a horizontal curved portion and a vertical clamping portion, and a slot receiving the vertical clamping portion therein is defined in a clamping surface of the upper supporting plate.

8. The back plate splicing structure for large-size backlight modules as claimed in claim 7, wherein the upper supporting plate comprises a connecting portion perpendicularly configured on the side plate, a clamping surface portion contacting the bottom flat plate, and an inclined surface portion connecting the connecting portion and the clamping surface portion; the connecting portion, the inclined surface portion, the lower supporting plate, and the side plate cooperatively define a clamping opening clamping the bottom flat plate therein; and a body of the bottom flat plate is curved towards the clamping opening to form a protruding arch column structure.

9. A back plate splicing structure for large-size backlight modules, the back plate comprising a bottom flat plate and a splicing member joined to an end of the bottom flat plate, wherein the splicing member comprises a side plate, and an upper supporting plate and a lower supporting plate configured on a same side of the side plate; the upper supporting plate comprises a connecting portion perpendicularly configured on the side plate, a clamping surface portion contacting the bottom flat plate, and an inclined surface portion connecting the connecting portion and the clamping surface portion, the inclined surface portion and the side plate face each other and are positioned at two opposite ends of the connecting portion respectively; the connecting portion, the inclined surface portion, the lower supporting plate, and the side plate cooperatively define a clamping opening clamping the bottom flat plate therein; a protrusion is configured on a bottom surface of the upper supporting plate, and a curved clamp clamping the protrusion therein is configured on an end of the bottom flat plate; the curved clamp comprises a horizontal curved portion and a vertical clamping portion, and a slot receiving the vertical clamping portion therein is configured on a clamping surface of the upper supporting plate; a body of the bottom flat plate is curved towards the clamping opening to form a protruding arc column structure and the inclined surface portion and the clamping opening are on the same side of the protruding arc column structure; and at least one fixing screw is configured between the bottom flat plate and the splicing member.

10. A liquid crystal display, comprising a back plate splicing structure for backlight modules, wherein the back plate comprises a bottom flat plate and a splicing member joined to an end of the bottom flat plate, the splicing member comprises a side plate, and an upper supporting plate and a lower supporting plate configured on a same side of the side plate; the upper supporting plate, the lower supporting plate, and the side plate cooperatively define a clamping opening clamping the bottom flat plate therein; the upper supporting plate fixes the bottom flat plate in the clamping opening, and at least one fixing screw is configured between the bottom flat plate and the splicing member;

wherein the upper supporting plate comprises a connecting portion perpendicularly configured on the side plate, a clamping surface portion contacting the bottom flat plate, and an inclined surface portion connecting the connecting portion and the clamping surface portion, the inclined surface portion and the side plate face each other and are positioned at two opposite ends of the connecting portion respectively; the connecting portion, the inclined surface portion, the lower supporting plate, and the side plate cooperatively define the clamping opening clamping the bottom flat plate therein; and a body of the bottom flat plate is curved towards the clamping opening to form a protruding arc column structure and the inclined surface portion and the clamping opening are on the same side of the protruding arc column structure.

11. The liquid crystal display as claimed in claim 10, wherein the upper supporting plate and the lower supporting plate are perpendicular to the side plate, a bottom surface of the upper supporting plate, a top surface of the lower supporting plate, and the side plate cooperatively define the clamping opening clamping the bottom flat plate therein; and a post-groove assembly structure is configured on the bottom surface of the upper supporting plate and the bottom flat plate.

12. The liquid crystal display as claimed in claim 11, wherein a protruding post is configured on the bottom surface of the upper supporting plate, and a groove engageable with the protruding post is configured on the bottom flat plate.

13. The liquid crystal display as claimed in claim 11, wherein a protruding post is configured on the bottom flat plate, and a groove engageable with the protruding post is configured in the bottom surface of the upper supporting plate.

14. The liquid crystal display as claimed in claim 10, wherein the at least one fixing screw is configured between the clamping surface portion and the bottom flat plate.

15. The liquid crystal display as claimed in claim 10, wherein a bottom surface of the upper supporting plate, a top surface of the lower supporting plate, and the side plate cooperatively define the clamping opening clamping the bottom flat plate therein; a protrusion is configured on the bottom surface of the upper supporting plate, and a curved clamp clamping the protrusion therein is configured on an end of the bottom flat plate.

16. The liquid crystal display as claimed in claim 15, wherein the curved clamp comprises a horizontal curved portion and a vertical clamping portion, and a clamping surface of the upper supporting plate defines a slot receiving the vertical clamping portion therein.

* * * * *